United States Patent
Vijendra et al.

(10) Patent No.: US 8,862,996 B1
(45) Date of Patent: Oct. 14, 2014

(54) METHOD AND APPARATUS FOR CONTAINER MAPPING PRESENTATION OF DISTRIBUTED SYSTEMS

(75) Inventors: Sudhir Vijendra, White Plains, NY (US); Jonathan Reeve, New York, NY (US); Vadym Nazarchuk, Piscataway, NJ (US)

(73) Assignee: EMC Corporation, Hopkinton, MA (US)

( * ) Notice: Subject to any disclaimer, the term of this patent is extended or adjusted under 35 U.S.C. 154(b) by 1760 days.

(21) Appl. No.: 11/477,292

(22) Filed: Jun. 29, 2006

(51) Int. Cl.
*G06F 15/177* (2006.01)
*G06F 3/048* (2013.01)

(52) U.S. Cl.
USPC .......................................... 715/734; 715/853

(58) Field of Classification Search
CPC .............................. G06F 15/177; G06F 3/048
USPC ................................... 715/734, 853
See application file for complete search history.

(56) References Cited

U.S. PATENT DOCUMENTS

| | | | | |
|---|---|---|---|---|
| 6,085,238 A * | 7/2000 | Yuasa et al. | ............... | 709/223 |
| 6,225,999 B1 * | 5/2001 | Jain et al. | ............... | 715/734 |
| 6,330,005 B1 * | 12/2001 | Tonelli et al. | ............... | 715/735 |
| 6,374,293 B1 * | 4/2002 | Dev et al. | ............... | 709/220 |
| 6,594,696 B1 * | 7/2003 | Walker et al. | ............... | 709/223 |
| 6,650,347 B1 * | 11/2003 | Nulu et al. | ............... | 715/853 |
| 6,697,087 B1 * | 2/2004 | Kelly | ............... | 715/735 |
| 6,772,204 B1 * | 8/2004 | Hansen | ............... | 709/220 |
| 6,885,387 B1 * | 4/2005 | Machida | ............... | 715/736 |
| 7,024,635 B1 * | 4/2006 | Menon et al. | ............... | 715/771 |
| 7,143,159 B1 * | 11/2006 | Grace et al. | ............... | 709/224 |
| 7,328,260 B1 * | 2/2008 | Muthiyan et al. | ............... | 709/224 |
| 7,487,240 B2 * | 2/2009 | Proulx et al. | ............... | 709/224 |
| 2002/0113816 A1 * | 8/2002 | Mitchell et al. | ............... | 345/734 |
| 2002/0135610 A1 * | 9/2002 | Ootani et al. | ............... | 345/734 |
| 2002/0186664 A1 * | 12/2002 | Gibson et al. | ............... | 370/254 |
| 2004/0031030 A1 * | 2/2004 | Kidder et al. | ............... | 717/172 |
| 2004/0059811 A1 * | 3/2004 | Sugauchi et al. | ............... | 709/224 |
| 2004/0213221 A1 * | 10/2004 | Civanlar et al. | ............... | 370/389 |
| 2005/0027851 A1 * | 2/2005 | McKeown et al. | ............... | 709/224 |
| 2007/0106768 A1 * | 5/2007 | Frietsch et al. | ............... | 709/223 |

* cited by examiner

*Primary Examiner* — Doon Chow
*Assistant Examiner* — Le Nguyen
(74) *Attorney, Agent, or Firm* — Krishnendu Gupta; Joseph D'Angelo

(57) ABSTRACT

A method, apparatus and computer program product for presenting information associated with elements of a distributed system is disclosed. A method for presenting information associated with selected ones of a plurality of elements in a distributed system, the method comprising the steps of representing attributes of, and relationships among the elements as associated configuration non-specific entities, associating selected one of the elements with at least one mutually exclusive group, applying a criterion to selected ones of the at least one groups, extracting attributes and/or relationships of the elements within the selected at least one group associated with the selected criterion and presenting information associated with the extracted attributes and/or relationships for the at least one selected group.

17 Claims, 14 Drawing Sheets

US 8,862,996 B1

METHOD AND APPARATUS FOR CONTAINER MAPPING PRESENTATION OF DISTRIBUTED SYSTEMS

RELATED FIELD

This application relates to the field of network management and more specifically to organizing, containing and displaying distribute system information.

A portion of the disclosure of this patent document contains illustrations of EMC Smarts network model, which is subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

BACKGROUND

As networks continue to expand or are merged together, the ability to manage the networks becomes increasingly more difficult. One method that has conventionally been used for presenting information regarding the network is to graphically represent distributed system or network elements by unique display elements or icons. However, as the number of network elements, and accordingly, the number of icons, increases, the ability to view the status of any one or group of networks has correspondingly become more difficult. Hence, in many situations or scenarios, users may resort to textual information to manage networks and/or determine a network status.

However, reviewing large amounts of textual information, even if color coded, presents its own set of problems for users in managing distributed systems and/or determining its status.

Hence, there is a need in the industry for a simplified method for organizing, containing and displaying sufficient information for network management.

SUMMARY OF THE INVENTION

A method, apparatus and computer program product for presenting information associated with elements of a distributed system is disclosed. A method for presenting information associated with selected ones of a plurality of elements in a distributed system, the method comprising the steps of representing attributes of, and relationships among the elements as associated configuration non-specific entities, associating selected one of the elements with at least one group, applying a criterion to selected ones of the at least one groups, extracting attributes and/or relationships of the elements within the selected at least one group associated with the selected criterion and presenting information associated with the extracted attributes and/or relationships for the selected groups

BRIEF DESCRIPTION OF THE FIGURES

The above and further advantages of the present invention may be better understood by referring to the following description taken into conjunction with the accompanying drawings in which.

Figure 1A:
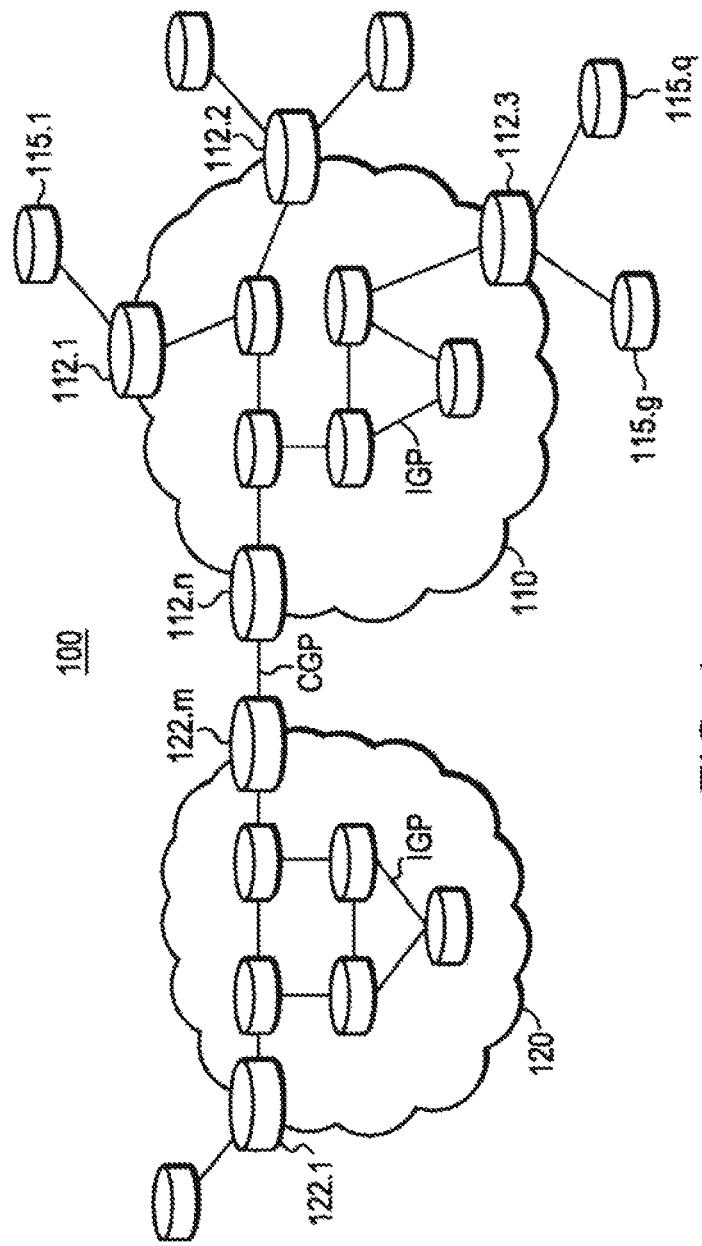
FIG. 1A illustrates a conventional network protocol configuration.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

FIG. 1A illustrates a conventional network system 100 configuration or topology composed of two independent distributed systems or networks 110 and 120. Network 110 includes a plurality of edge nodes or gateways 112.1-112.$n$, which allow bi-directional communication among external users 115.1-115.$q$ or networks, e.g., network 120. Within network 110 are a plurality of internal elements, e.g., routers, servers, switches, etc., that enable communication from one network gateway to another. Network 120, similarly, includes edge nodes 122.1-122.$m$ and internal servers, routers and switches.

Furthermore, the communication protocols used between internal and external network elements are referred to as IGP (Internal Gateway Protocol) and EGP (External Gateway Protocol). IGPs may be selected from well-known protocols such as OSPF, IS-IS and EIRGP. EGP may be selected from the well-known protocol such as BGP (Border Gateway Protocol).

Figure 1B:
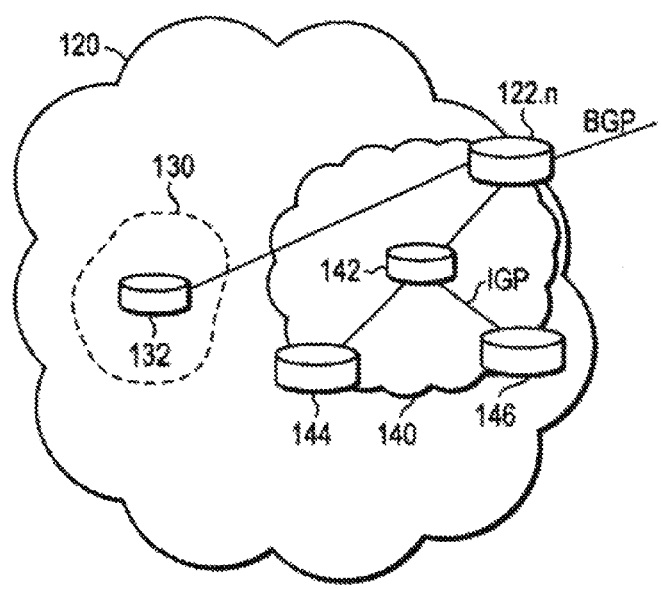
FIGS. 1B, 1C, and 1D illustrate a conventional method of displaying information associated with the network shown in FIG. 1A.

FIG. 1B illustrates the division of network 120 into Autonomous System (AS) 130 and 140. Autonomous Systems are used to divide or segregate elements of a larger network into distinct groups or areas for managing the contained elements on a smaller, e.g., local, level. The use of Autonomous Systems is further advantageous in allowing for the introduction of additional elements into individual areas or the addition of new Autonomous Systems without significant impact on the management of the overall distributed system.

In the illustrated network shown in FIG. 1B, network 120 is composed of two ASs 130 and 140 (groups). AS 130 includes the single element 132 and AS 140 includes elements 122.$n$, 142, 144 and 146. Elements 132, 142, 144 and 146 communicate with element 122.$n$ through an IGP protocol and element 122.$n$ further communicates outside network 120 through a BGP protocol. It would be recognized that the number of routers or elements shown within each of AS 130 and 140 is used only to illustrate exemplary network configurations and should not be considered a limitation of the invention described herein.

Figure 1C:
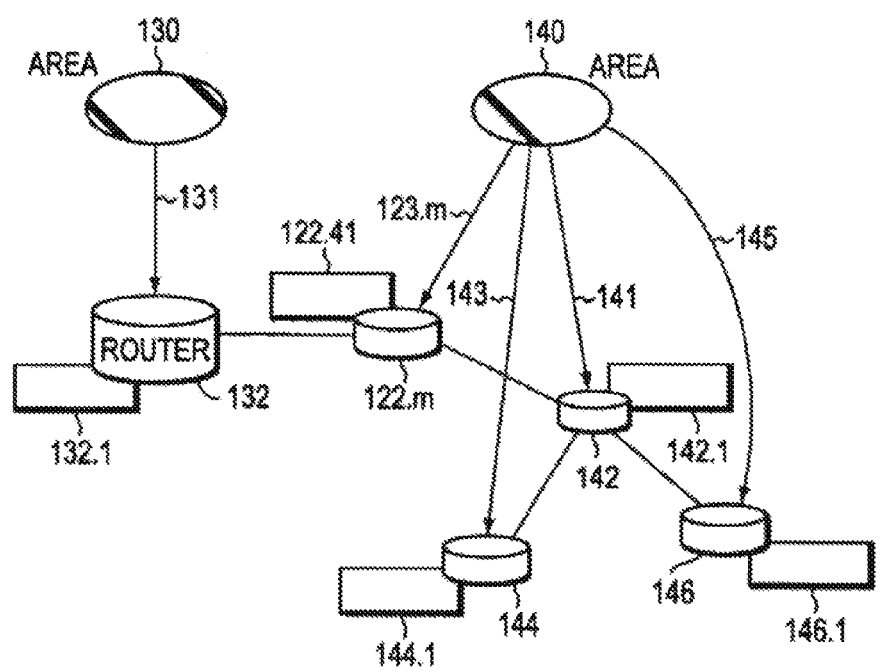

FIG. 1C represents a conventional method of logically representing and presenting the information shown in FIG. 1B. In this illustrative example, AS 130 and AS 140 are represented as icons, and shown by the connecting arrows 131, 123.$n$, 141, 143, and 145, to include the respective elements 132, 122.$n$, 142, 144 and 146. Further illustrated is a status bar 132.1, 122.$n$1, 142.1, 144.1, and 146.1, which provides status information regarding the associated element. Using this graphical representation of the AS 130 and AS 140, a user may visually review status information regarding each of the presented network elements. A conventional red/yellow/green color or plus/minus/null indicator may further be used to visually present the status information to a user. Although, not shown, it would be recognized that each of the network elements includes further information (attributes) used to define and represent the elements. For example, element name, element type, element address, capacity, number of ports, etc., are associated with each of the network elements.

Figure 1D:
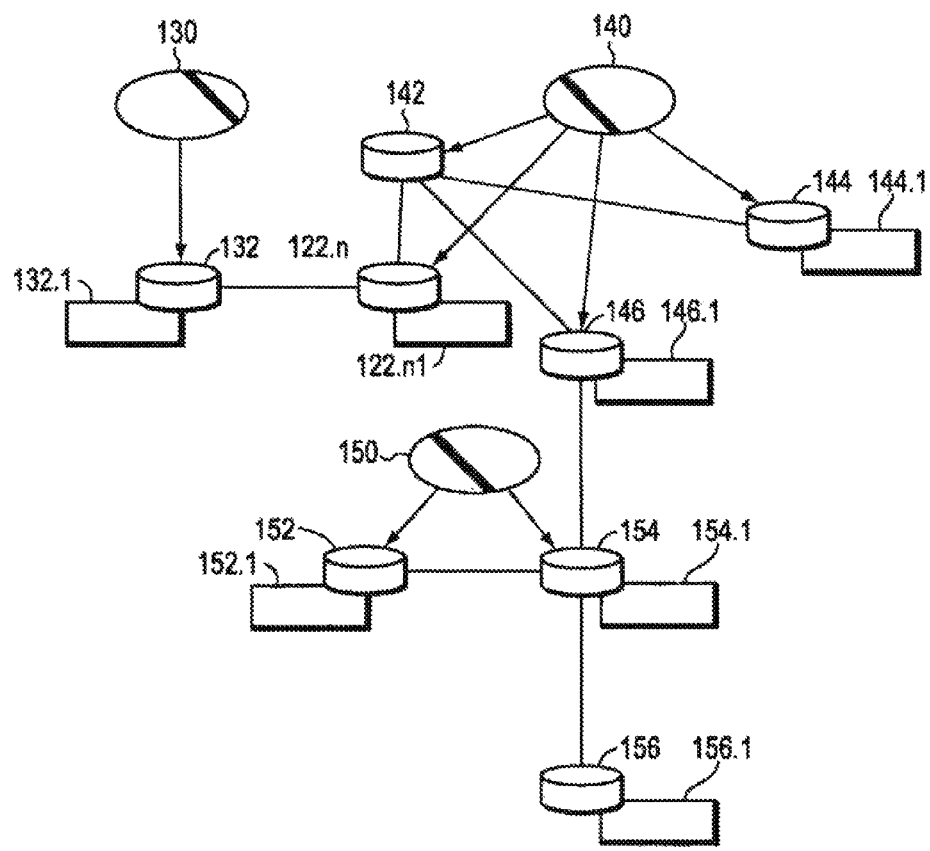

FIG. 1D illustrates a conventional method of logically representing and presenting additional Autonomous Systems and elements that may be added to the distributed system shown herein. In this case, AS 150 includes elements 152 and 154 and element 154 is connected to independent element 156. Status bars are also shown associated with each of the additional network elements.

Figure 2A:
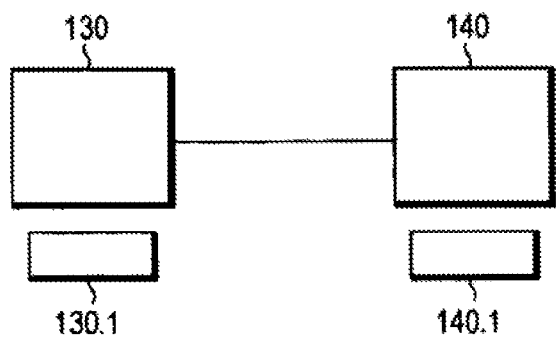
FIG. 2A-2C illustrates container representations of the distributed system elements in accordance with the principles of the invention.

FIG. 2A illustrates an exemplary method for representing and presenting element information in accordance with the principles of the invention. In this exemplary presentation, ASs 130 and 140 are each logically represented as containers from which information associated with an AS may be determined. The container mapping representing ASs 130 and 140 provides a simplified method for presenting information associated with an AS. Associated with each AS 130 and 140 is a status bar 130.1, 140.1, respectively, which provides a visual indication of the status of the elements within the container mapping representing ASs 130 and 140. As previously discussed, the status bar may use a red/yellow/green color combination (or similar color combination) to indicate the status of the associated AS. Using the container mapping shown, herein, a viewer is provided a simplified presentation of the distributed system at a very high level.

Figure 2B:
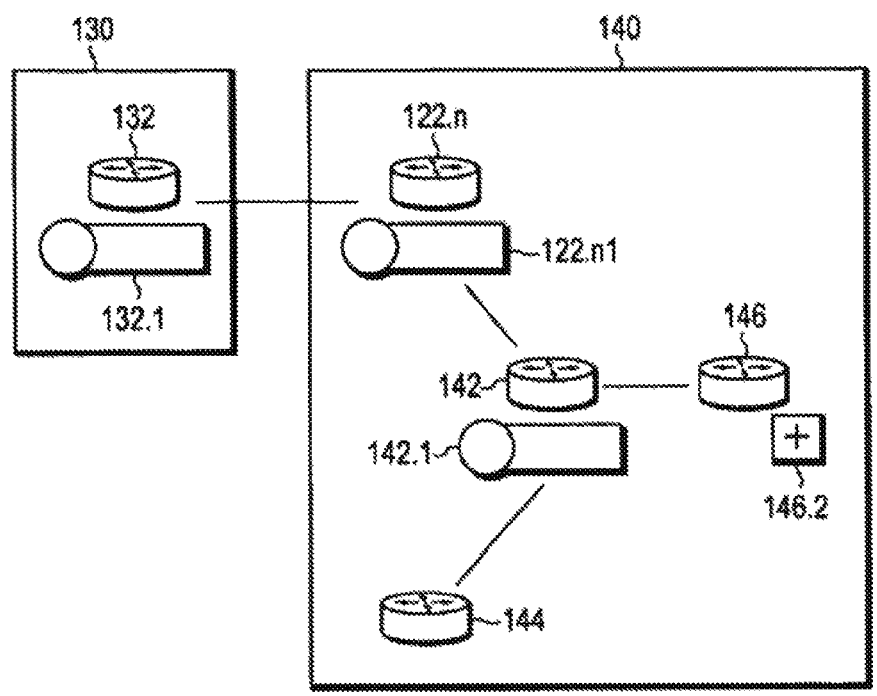

Additionally, each of the container maps may be individually expanded to present more detailed information contained therein. FIG. 2B illustrates an expansion of the container maps shown in FIG. 2A. In this illustrated example, each of the elements, the associated status bars and their connectivity or relationship within an AS is presented to the viewer. The viewer may then be presented further information, either visually or textually, regarding one or more of the illustrated elements.

Figure 2C:
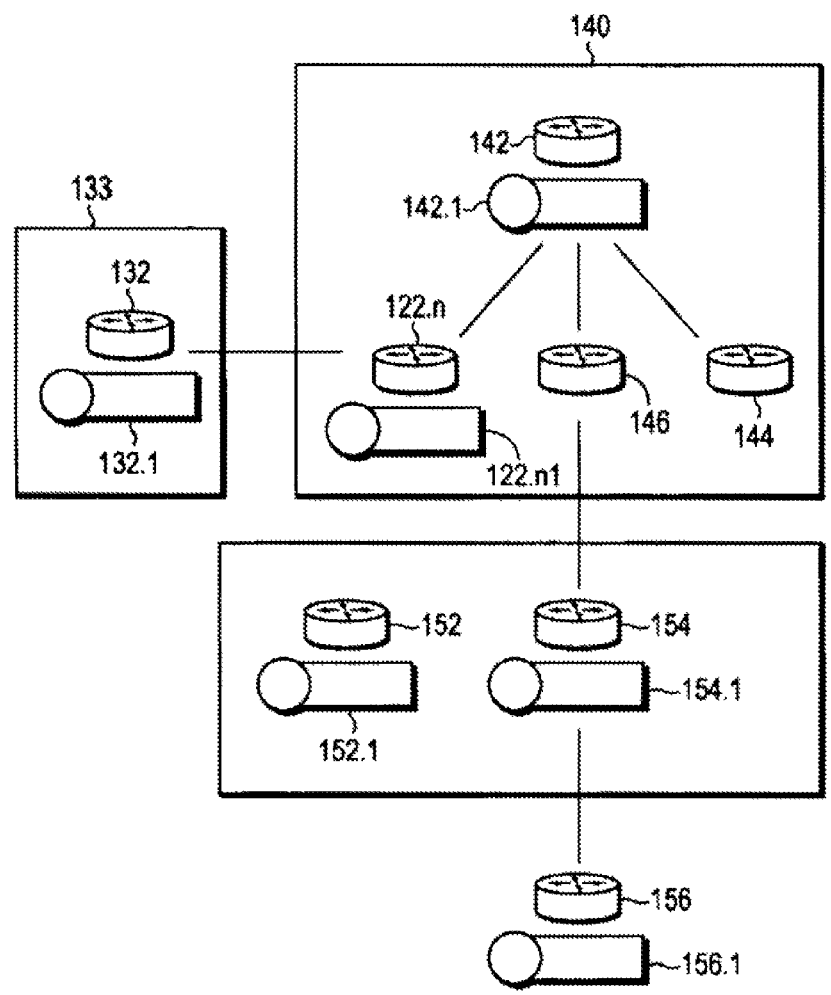

FIG. 2C represents an expansion of container mapping in accordance with the principles of the invention in comparison with the presentation shown in FIG. 1D. In illustrated case, each of the ASs 130, 140 and 150 are expanded to display the elements contained therein. It would, however, be recognized that in accordance with the principles of the invention, all the ASs need not be expanded at the same time and that the presentation is significantly uncluttered as only the information that is desired by a viewer is presented. Associated with each AS 154 and 156 is a status bar 154.1, 156.1, respectively, which provides a visual indication of the status of the elements within the container mapping representing ASs 154 and 156.

Figure 3A:
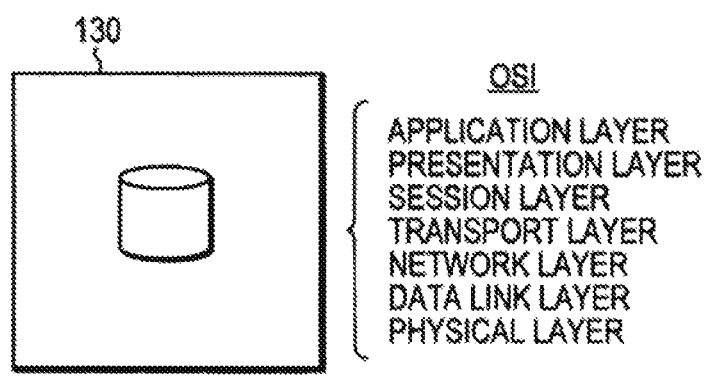
FIGS. 3A-3B illustrate further aspects of the container mapping representation of distributed system elements in accordance with the principles of the invention.

FIG. 3A illustrates a method for selecting container mapping views in accordance with the principles of the invention. In this illustration, a drop-down menu (not shown) may be used to display information regarding the distributed system attributes and/or relationships among elements in accordance with different layers (levels) of the well-known OSI protocol stack, for example. The OSI protocol stack is known to provide a standardized method for transmitting data within a distributed system and is represented as:

Layer 7. Applications Layer: generates or interprets data, may also provide encryption or decryption;

Layer 6. Presentation Layer: determines how computers represent data [ASCII, GIF];

Layer 5. Session Layer: establishes a communication session, Security, and Authentication;

Layer 4. Transport Layer: provides transfer correctness, data recovery, and flow control. TCP is a layer 4 protocol;

Layer 3. Network Layer: provides address assignment, and Packet's forwarding methods;

Layer 2. Data Link layer: encodes data into a valid signaling format; and

Layer 1. Physical Layer: defines the physical [hardware] implementation and the electrical [signal level] implementation of the bus; network cabling, connector type, pin-out, physical data rates, maximum transmission distances, and data transmission encoding.

The OSI protocol stack provides a convenient criterion for selecting one or more views of selected network elements, but should not be considered the only selection criterion that may be used. For example, the selection criteria may be based on a physical element type, e.g., router, switch, load balancer, etc.

Figure 3B:
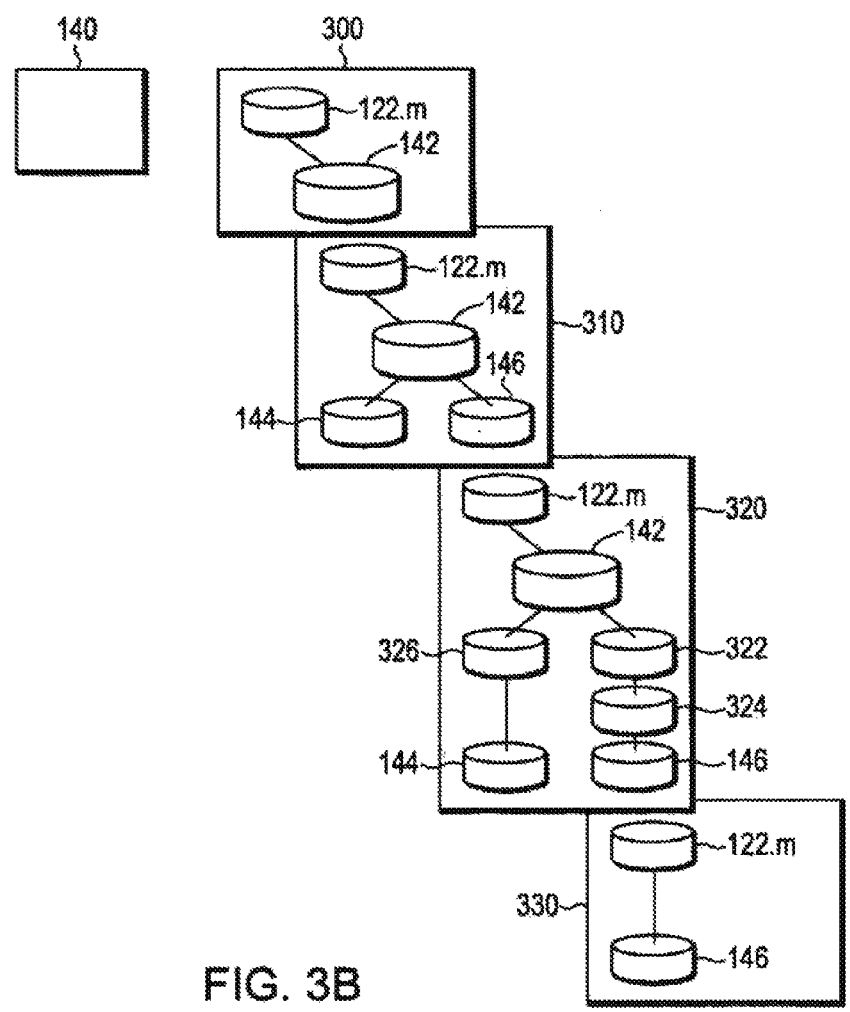

FIG. 3B illustrates an exemplary expansion of the information contained in AS 140 with regard to application layer 300, network layer 310, physical layer 320, and an element attribute 330, respectively, with regard to an exemplary specific distributed system configuration. With reference to container mapping 300, this container mapping illustrates only elements 122.$n$ and 142, which contain attributes and/or relationships associated with applications executing within AS 140. With reference to container mapping 310, this container mapping illustrates the expansion of the AS 140 with regard to the element attributes and/or relationships associated with the network layer. With reference to container mapping 320, this container mapping illustrates the element attributes and/or relationships of AS 140 that constitute the physical layer. In this illustrated case, elements 322, 324 and 326 are illustrated as these elements constitute the physically elements within AS 140. Elements 322, 324 and 326 may represent elements, such as switches, routers, servers, etc., that are used in physically routing data packets between element 142 and elements 144 and 146. It would be recognized from the exemplary container mapping shown herein that the physical elements shown in mapping 320 need not have an associated logical representation in another container mapping, e.g., container mapping 300. With reference to container mapping 330, this container mapping illustrates the element attributes and/or relationships of AS 140 that are associated with at least one attribute of the elements of AS 140. In this illustrated case, elements 122.$n$ and 146 are illustrated as these elements include at least one similar element within AS 140, e.g. function, name, role, status, etc. Elements 122.$n$ and 146 may have the same functionality, for example, router reflectors.

Although not shown, it would be recognized that additional information attributes and/or relationships associated with the container mapping may also be visually or textually presented. Accordingly, in one aspect of the invention, a status bar associated with a physical element may indicate that the physical element is operating correctly. However, for a different container mapping representation, the status bar for an associated logical element may indicate some degradation which is caused by a non-physical operation, e.g., processor resource limitation.

Returning to FIG. 2B, the illustrated status bar plus-sign icon 146.2 further represents that element 146 includes further communication capability and may be expanding in accordance with the principles of the invention. More specifically, utilizing the features associated with icon 146.2, the container map 140 may be expanded to present container map 150, as shown in FIG. 2C. Hence, the ability of providing container mapping for selected elements may further be embedded within container maps and a viewer, using a graphic user interface (GUI), may expand and contract the information presented in each container.

In one aspect of the invention, the distributed system may be logically represented to contain the associated element attributes and their relationship to other network elements. Logical representation (modeling) of the distributed system is advantageous as it provides for network configuration non-specific objects to represent network elements and their relationships.

Figure 4A:
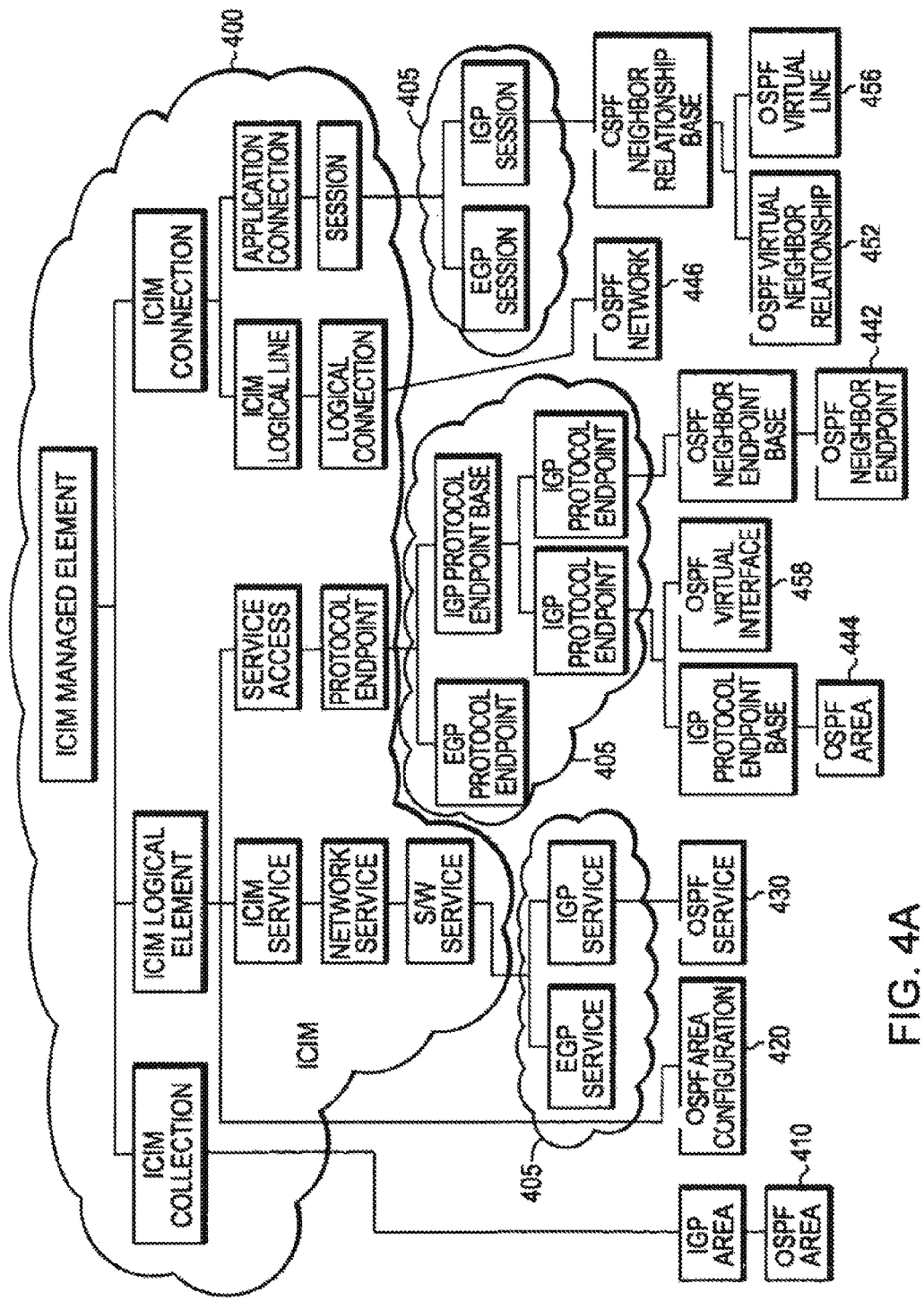
FIG. 4A-4D illustrate exemplary model representations of distributed systems in accordance with the principles of the invention.
Figure 4B:
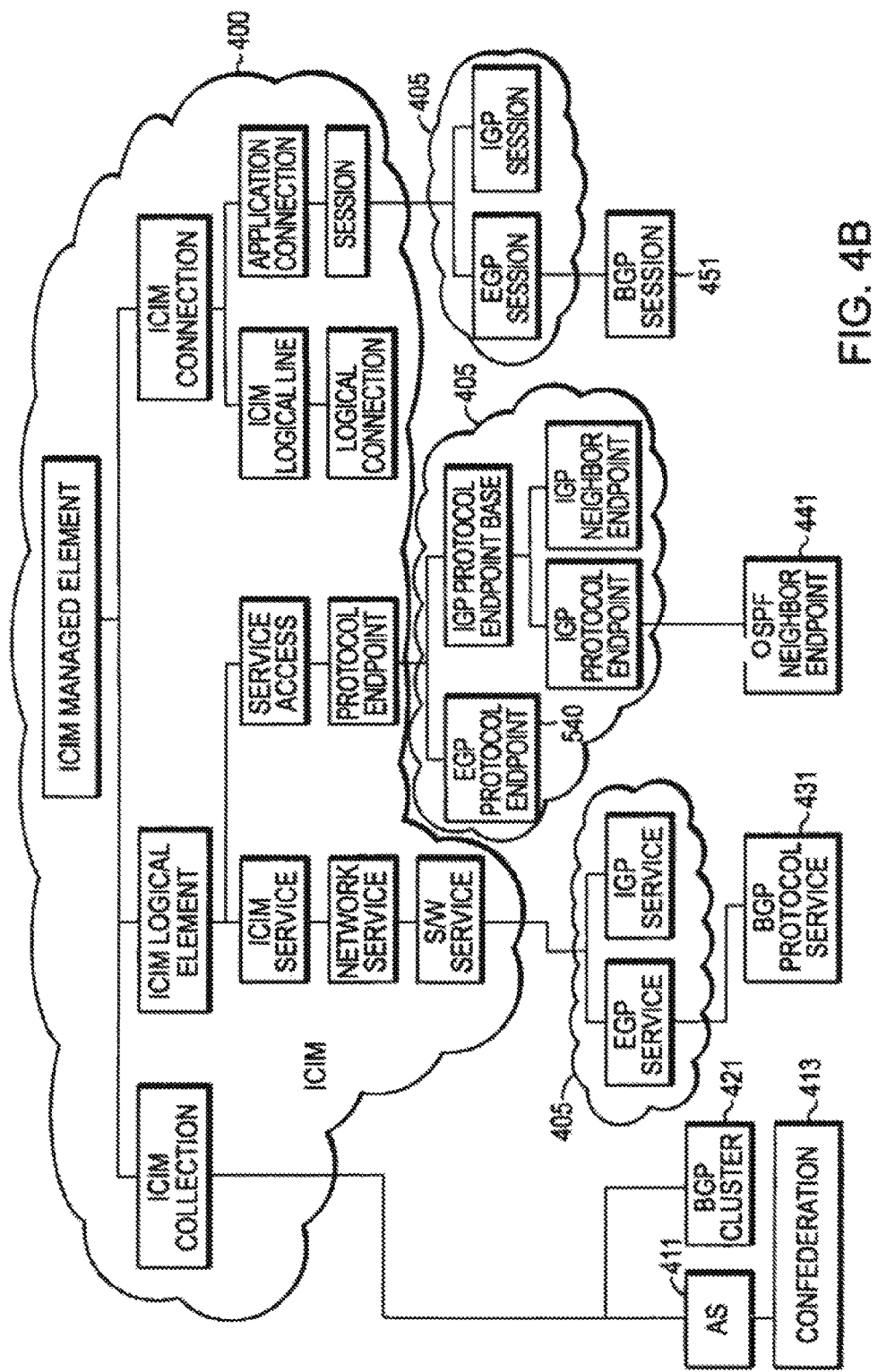

FIGS. 4A and 4B illustrate an exemplary representation of BGP and OSPF protocols (OSI layer 4). The representation shown is an extension of known network models, such as the EMC® SMARTS® Common Information Model (ICIM) 400, or similarly defined or pre-existing CIM-based model. EMC and SMARTS are trademarks of EMC Corporation, Inc., having a principle place of business in Hopkinton, Ma, USA. The EMC ICIM model is an extension of the DMTF/SMI model. Model based system representation is more fully discussed in commonly-owned U.S. patent application Ser. No. 11/211,234, entitled, "Method and Apparatus for Configuration and Analysis of Network Routing Protocols," filed Aug. 25, 2005 and Ser. No. 11/395,456, entitled "Method and Apparatus for Configuration and Analysis of Internal Network Protocols," filed Mar. 31, 2006, the contents of both of which are incorporated by reference herein.

In this illustrated model representation of OSI layer 4 protocols, the base model selected 400 is extended to accommodate the inclusion of elements associated with Internal (IGP) and External (EGP) protocols by incorporating objects and classes for distinguishing and processing the different protocols. These objects are grouped or encapsulated in entities 405. As these objects are used to distinguish between IGP and EGP process, it would be appreciated that they are not necessary for the processing associated with the identification and management of the specific internal or external protocol. Hence, they need not be described in detail herein.

As would further be appreciated, the objects and relationships described herein are independent of the specific network configuration (i.e., configuration non-specific) and present parameters or attributes of the components or operations comprising the network protocols.

FIG. 4A illustrates an extension of an exemplary model-based 400 class hierarchy for entities or devices using IGP OSPF protocol. In this case, OSPF_Area object 410 contains OSPF_ProtocolService objects that are abstract representations of the OSPF process on each device. Each OSPF_ProtocolService 430 has it own view of each OSPF_Area 410 in which it participates and this is modeled by the OSPF_AreaConfiguration object 420. The OSPF_ProtocolService contains OSPF_Interfaces 444 and OSPF_VirtualInterfaces 458 which are connected to each other via OSPF_Networks 456. Each OSPF_Interface 444 participating in an OSPF_Network 456 forms an OSPF_NeighborRelationship 452 with neighboring OSPF_Interfaces 444. The OSPF_NeighborEndpoint 442 models the OSPF_NeighborRelationship 452 from the point of view of each of the two participating OSPF_Interfaces 444.

An OSPFArea 410 represents a set of IP subnets within an Autonomous System (AS). If more than one OSPF area is configured for an AS, one of the areas is designated the backbone area (Area 0). All non-backbone areas within an AS have a physical connection to the backbone area. Attributes of OSPFArea 410 are at least an area identification, an IP Address and an Area type. An OSPF area configuration object 420 represents an OSPF area as configured from the viewpoint of one of the routing devices running an OSPF service. Each routing device has its own view of the area's attributes. An OSPFService object 430 represents an OSPF protocol process running on a routing device. An OSPFS service object manages the protocol exchanges with other OSPF services. An OSPFNetwork object 446 represents a collection of routing devices running OSPF services on an IP network. An OSPFInterface 444 is a logical interface, associated with an underlying IP interface that participates in the OSPF protocol exchange. An OSPFVirtualInterface object 458 represents a virtual interface associated with an underlying IP interface that participates in the OSPF protocol exchange. A virtual interface is associated with a virtual link, represented by object OSPFVirtualLink 456, which is used to link an OSPFArea 410 that does not have a physical connection to the backbone area (Area 0). The virtual link is established between two ABRs having a common OSPF area, and one ABR is connected to the backbone area. An OSPFNeighborEndpoint 442 represents a type of service access point defined for each OSPF interface on the host routing device. An OSPFNeighborEndpoint 442 represents a logical element that holds the status of a single OSPF neighbor relationship from the point of view of one of the OSPF interfaces. An OSPFVirtualNneighborEndpoint 452 represents a type of service access point defined for each OSPF virtual interface on the host routing device. An OSPFVirtualNeighborEndpoint object is a logical element that holds the status of a single OSPF virtual link from the point of view of one of the OSPF virtual interfaces. An OSPF neighbor relationship represents a link between two OSPF neighbor endpoints. Each complete OSPF neighbor relationship connects two OSPF neighbor endpoints. An OSPFVirtualLink represents a link between two OSPF virtual neighbor end points. Each complete OSPF virtual link connects two OSPF virtual neighbor endpoints.

FIG. 4B illustrates an extension of an exemplary model-based class hierarchy 400 for entities or devices utilizing BGP. In this case, a AS object 411 contains BGP_ProtocolService objects 431 which are representations of the BGP process on each device. A AS 411 may be a BGP_Confederation 413 containing other BGP_AS. The BGP_ProtocolService 431 contains BGP_NeighborEndpoints 441 connected to one another via BGP_Session objects 451. 421 shows a BGP_Cluster.

A BGP AS 411 objects consist of one or more routing devices running BGP services. The AS object 411 contains attributes of an identifier associated with or number of the autonomous system being monitored and a Confederation identifier which identifies BGP confederation number to which the BGP autonomous system is a member. A BGP service 431 represents a BGP protocol process running on a routing device. The BGP service manages the protocol exchanges with other BGP services. Any BGP service that forms a session with any other BGP service is referred to as a BGP speaker. BGP service and BGP speaker are essentially the same terms. Attributes of the BGPService object are at least an AS identifier, a routing identifier that uniquely identifies the routing device that the BGP service is running on. A BGPProtocolEndpoint object 540 is a type of service access point defined for each BGP physical interface on the BGP routing device. A BGPProtocolEndpoint object is a logical element that holds the status of a single BGP session from the point of view of one of the BGP physical interfaces. A BGP session is a connection between the local BGP service running on the local routing device and a remote BGP service running on a remote routing device. The remote BGP service running on the remoter routing device is also known as the BGP peer. A BGPSession object 451 represents a link between two BGP protocol endpoints. Each complete BGP session connects two BGP protocol endpoints.

Figure 4C:
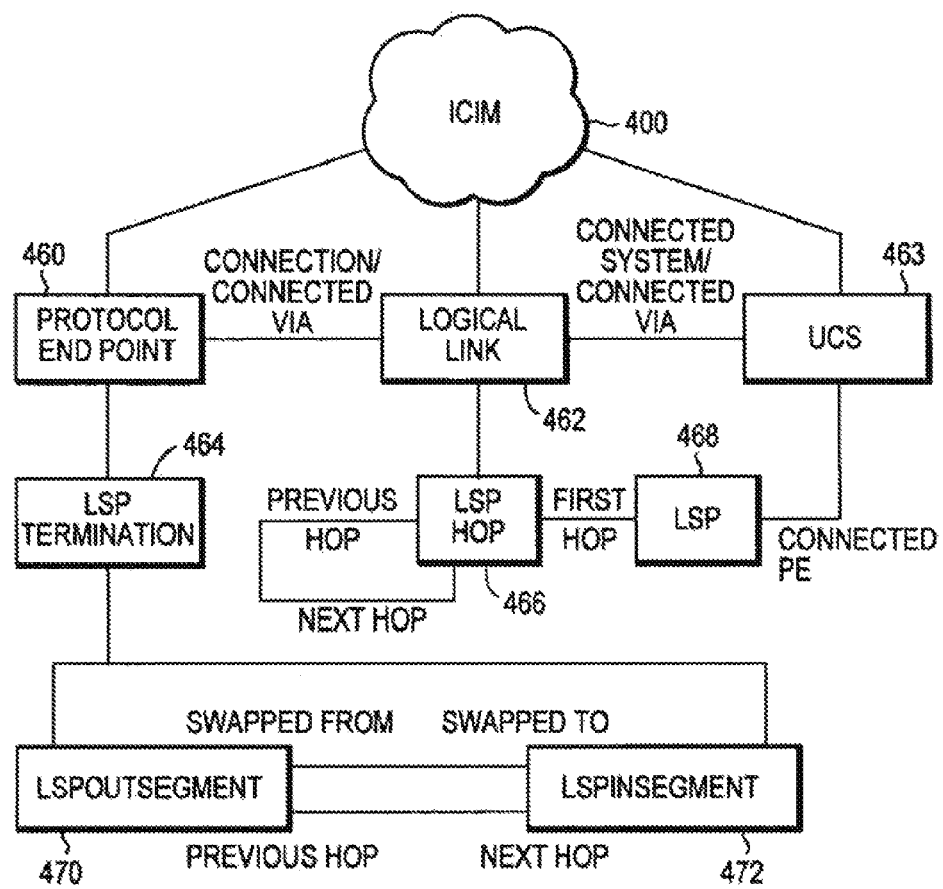

FIG. 4C illustrates an extension of an exemplary model-based class hierarchy 400 for entities or devices of an MPLS-VPN network. In this exemplary model, configuration non-specific object classes are associated with the attributes and relationships of a MPLS-VPN network. For example, the object classes ProtocolEndpoint 460, LogicalLink 462 and UCS 463 (Unitary Computer System) are representative of generic concepts of protocol endpoint, logical link and unitary computer systems, respectively. Further, the Protocol Endpoint 460 and the Logical Link 462 are related in each direction by a ConnectedVia/ConnectedTo relationship.

Additional object classes associated with the MPLS model may be defined as:

LSPTermination 464, which represents incoming or outgoing labels in the MPLS forwarding table;

LSPHop 466, which represents a uni-directional logical link between two devices or components in an MPLS network across which MPLS-labeled packets are sent; and LSP 468, which represents a concatenation of LSPHops and represents the "label switched path" taken by labeled packets across an MPLS network.

In addition, representations of the MPLS labels may be defined as:
  LSPInSegment 470; and
  LSPOutSegment 472,
    where, these classes represent the incoming and outgoing labels,
    respectively, in the MPLS forwarding/routing table and are subclasses of the LSPTermination 220 class.

The LSPInSegment 472 and LSPOutSegment 470 objects are related by two pairs of relationships: PreviousHop/NextHop and SwappedFrom/SwappedTo. Relationship PreviousHop/NextHop relates two different LSPTerminations 220 that are on opposite ends of an LSPHop and have the same label attribute. Relationship object class SwappedFrom/SwappedTo relates an LSPInSegment object class, representing an incoming label, with an associated LSPOutSegment object class, representing the outgoing label. These labels are swapped for or changed to on the same device or component.

Base model UCS object class 463 represents generic computer systems, such as nodes, servers or routers. UCS 463 hosts LSPTermination points and is related to LSPs via the ConnectedPE relationship that defines a LER or LSR, i.e., router, unitary computer system. The base model further defines the relationship ConnectedSystems/ConnectedVia between objects classes UCS and LogicalLink.

Figure 4D:
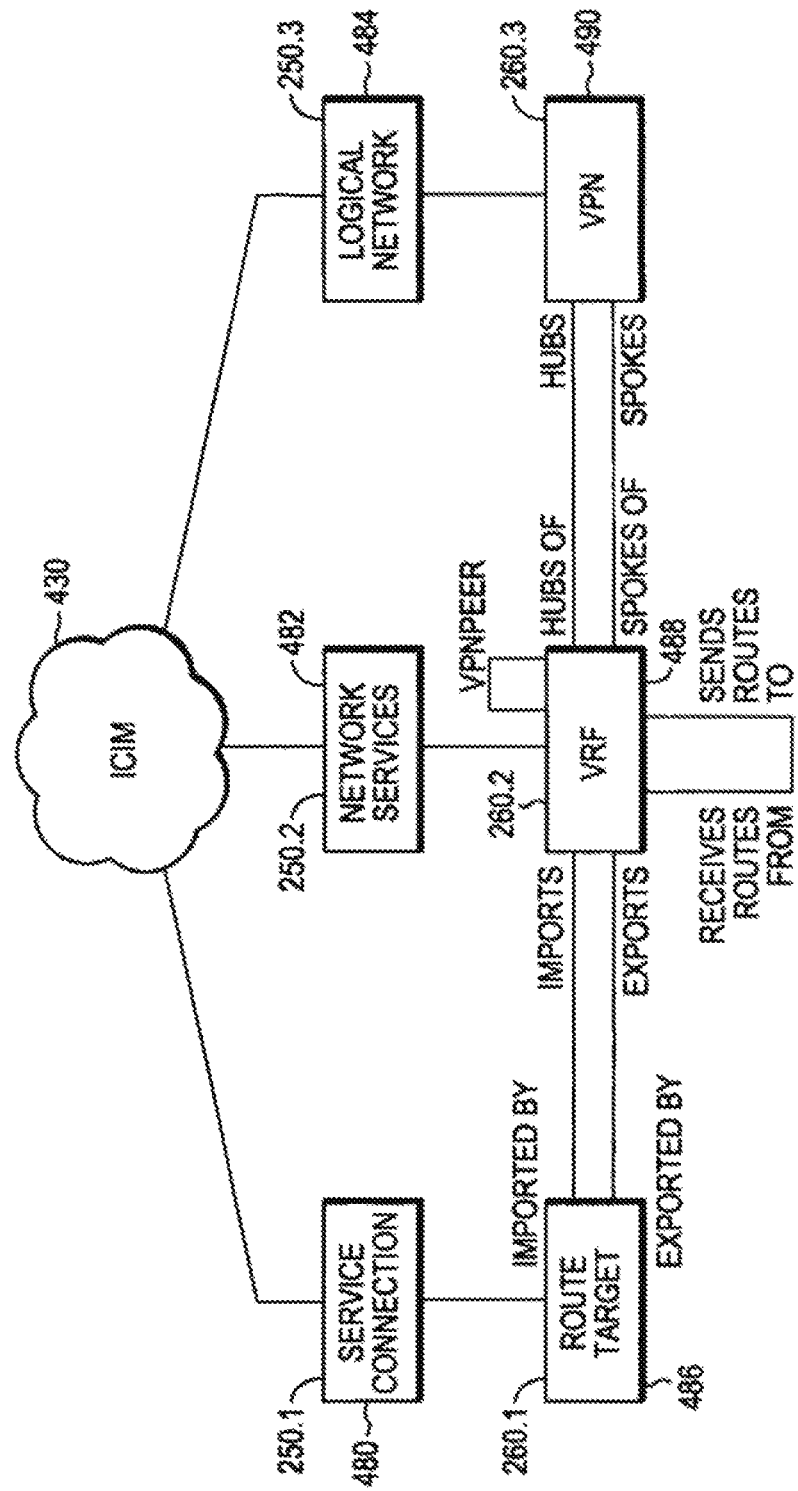

Referring now to FIG. 4D, the exemplary MPLS model further defines object classes such as ServiceConnection 480, NetworkService 482, and LogicalNetwork 484 that are representative of generic concepts of service connections, network services, and logical networks, respectively.

Additional object classes may be defined as:
RouteTarget 486 which is selected as a type of service connection;
VRF 488 which is designated as a type of network service; and
VPN 490 which is designated as a type of logical network.

Further illustrated is the relationship between RouteTarget 486 and VRFs 488 which may be expressed in the object classes referred to as ImportedBy/Imports and ExportedBy/Exports. Similarly, the relationship between VRFs 488 and the VPN 490 may be expressed in the object classes HubsOf/Hubs and SpokesOf/Spokes.

It would be recognized by those skilled in the art that the information to populate or determine instances of the object classes, i.e., representation of components, and the relationship between components, i.e., representation of component relationships, of the models defined herein may be pre-loaded or predetermined or may be determined dynamically by importation, discovery or provided by one or more the sources of such information, e.g., Simple Network Management Protocol (SNMP) MIBs, MPLS-LSR-MIB, MPLS forwarding tables, MPLS-VPN-MIB, element management systems. Similarly, manual commands such as Command Line Interface (CLI) at network devices, Show commands that retrieve and display information regarding forwarding-table, VRFs, BGP and MBGP sessions, may be used to provide information to populate the object classes shown in the exemplary models shown herein. Each of these sources of information are representative of communications that may occur dynamically over the physical network that the model overlays, i.e., layered over, and should not be considered the only methods to dynamically populate the object classes shown.

Although the model-based representation illustrated is associated with protocol elements (OSI layer 3) or a MPLS network, it would be recognized that model representations for each network element may be prepared for each layer associated with the OSI protocol stack.

Although the invention has been described with a network representation of a distributed, it would be recognized that the invention is applicable to other types of distributed systems. For example, a physical device, such as a server, router, switch, may be modeled or represented on its physical or logical characteristics. More specifically, a router may include a plurality of cards each including a physical interface that may be represented logically and used within virtual machines. Accordingly, the division of the distributed system into at least one group may be performed either physically or logically (virtually).

Figure 5:
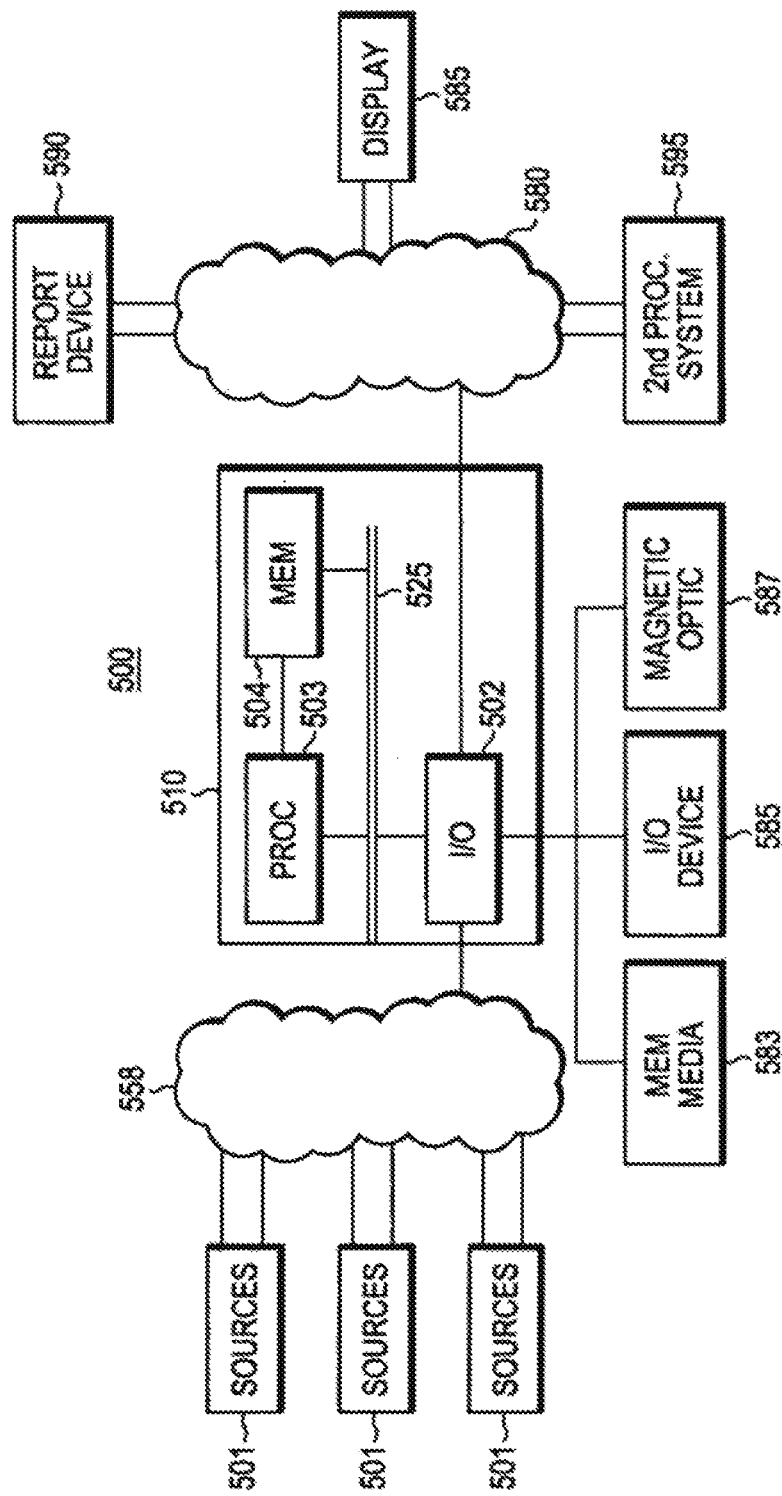
FIG. 5 illustrates an exemplary system for implementing the processing shown herein.

FIG. 5 illustrates an exemplary embodiment of a system 500 that may be used for implementing the principles of the present invention. System 500 may contain one or more input/output devices 502, processors 503 and memories 504. I/O devices 502 may access or receive information from one or more sources or devices 501. Sources or devices 501 may be devices such as routers, servers, computers, notebook computer, PDAs, cell phones or other devices suitable for transmitting and receiving information responsive to the processes shown herein. Devices 501 may have access over one or more network connections 550 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 502, processors 503 and memories 504 may communicate over a communication medium 525. Communication medium 525 may represent, for example, a bus, a communication network, one or more internal connections of a circuit, circuit card or other apparatus, as well as portions and combinations of these and other communication media. Input data from the client devices 501 is processed in accordance with one or more programs that may be stored in memories 504 and executed by processors 503. Memories 504 may be any magnetic, optical or semiconductor medium that is loadable and retains information either permanently, e.g. PROM, or non-permanently, e.g., RAM. Processors 503 may be any means, such as general purpose or special purpose computing system, such as a laptop computer, desktop computer, a server, handheld computer, or may be a hardware configuration, such as dedicated logic circuit, or integrated circuit. Processors 503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 504. The code may be read or downloaded from a memory medium 583, an I/O device 585 or magnetic or optical media, such as a floppy disk, a CD-ROM or a DVD, 587 and then stored in memory 504 or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Ca. USA.

Information from device 501 received by I/O device 502, after processing in accordance with one or more software programs operable to perform the functions illustrated herein, may also be transmitted over network 580 to one or more output devices represented as display 585, reporting device 590 or second processing system 595.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, although the invention has been described with regard to Autonomous systems within a network, it would be recognized that the method described herein is applicable to any combination of sub-system elements or may be expanded to include all the elements of the network.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for presenting information associated with selected elements in a distributed system, the method comprising the steps of:

grouping the elements into one or more autonomous systems;

representing attributes of, and relationships between the elements in the one or more autonomous systems as associated configuration non-specific entities;

presenting one or more container mapping views; wherein each container mapping view represents one of the one or more autonomous systems and the relationship between the one or more autonomous systems;

enabling a selection of one or more layers of an OSI protocol stack;

applying a criterion, for each layer selected of the OSI protocol stack, to the one or more container mapping views;

extracting at least one characteristics from a characteristic set including attributes of the elements and the relationships between the elements within the one or more autonomous systems associated with the selected criterion, for each selected layer of the OSI protocol stack, and the one or more selected layers of the OSI protocol stack;

associating an indicator with each of the one or more container mapping views for indicating additional information associated with the one or more container mapping views;

associating the at least one characteristic with regard to a configuration of the distributed system; and graphically presenting the indicator for the one or more container mapping views and relationships between the one or more mapping containers; wherein each indicator for the one or container mapping views enables a user to expand a container mapping view of the at least one container mapping views based on the selection of the at least one layer of the OSI protocol stack; where expanding the container mapping view presents the information associated with the extracted attributes and the relationships between the represented elements of the autonomous system associated with the container mapping view for each selected layer of the OSI protocol stack.

2. The method as recited in claim 1, wherein the selection criterion is further based on a selection from a group consisting of an MPLS network and an MPLS-VPN network.

3. An apparatus for presenting information associated with selected elements in a distributed system, the apparatus comprising:

a processor in communication with a memory, the processing executing code for:

grouping the elements into one or more autonomous systems;

representing attributes of, and relationships between the elements in the one or more autonomous systems as associated configuration non-specific entities;

presenting one or more container mapping views; wherein each container mapping view represents one of the one or more autonomous systems and the relationship between the one or more autonomous systems;

enabling a selection of one or more layers of an OSI protocol stack;

applying a criterion, for each layer selected of the OSI protocol stack, to the one or more container mapping views;

extracting at least one characteristics from a characteristic set including attributes of the elements and the relationships between the elements within the one or more autonomous systems associated with the selected criterion, for each selected layer of the OSI protocol stack, and the one or more selected layers of the OSI protocol stack;

associating an indicator with each of the one or more container mapping views for indicating additional information associated with the one or more container mapping views;

associating the at least one characteristic with regard to a configuration of the distributed system; and graphically presenting the indicator for the one or more container mapping views and relationships between the one or more mapping containers; wherein each indicator for the one or container mapping views enables a user to expand a container mapping view of the at least one container mapping views based on the selection of the at least one layer of the OSI protocol stack; where expanding the container mapping view presents the information associated with the extracted attributes and the relationships between the represented elements of the autonomous system associated with the container mapping view for each selected layer of the OSI protocol stack.

4. The apparatus as recited in claim 3, the processor further executing code for:

presenting information associated with the status of each presented group.

5. A computer-program product for presenting information associated with selected elements in a distributed system, the computer program product comprising:

a non-transitory computer readable medium encoded with computer executable program code, the code configured to enable one or more processors to execute:

grouping the elements into one or more autonomous systems;

representing attributes of, and relationships the elements in the one or more autonomous systems as associated configuration non-specific entities;

presenting one or more container mapping views; wherein each container mapping view represents one of the one or more autonomous systems and the relationship between the one or more autonomous systems;

enabling a selection of one or more layers of an OSI protocol stack;

applying a criterion, for each layer selected of the OSI protocol stack, to the one or more container mapping views;

extracting at least one characteristics from a characteristic set including of the elements and the relationships between the elements within the one or more autonomous systems associated with the selected criterion, for each selected layer of the OSI protocol stack, and the one or more selected layers of the OSI protocol stack;

associating an indicator with each of the one or more container mapping for indicating additional information associated with the one or more container mapping views;

associating the at least one characteristic with regard to a configuration of the distributed system; and graphically presenting the indicator for the one or more container mapping views and relationships between the one or more mapping containers; wherein each indicator for the one or container mapping views enables a user to expand a container mapping view of the at least one container mapping views based on the selection of the at least one layer of the OSI protocol stack; where expanding the container mapping view presents the information associated with the extracted attributes and the relationships between the represented elements of the autonomous system associated with the container mapping view for each selected layer of the OSI protocol stack.

6. The computer-program product as recited in claim 5, wherein the instruction further causing the processing system to execute the steps of:

presenting information associated with the status of each presented group.

7. The method as recited in claim 1, wherein the selection criterion is based on at least one attribute of a selected one of the elements.

8. The method as recited in claim 1, wherein the at least one group is select from the group of: physical and logical elements.

9. The apparatus as recited in claim 3, wherein the selection criterion is based on at least one attribute of a selected one of the elements.

10. The apparatus as recited in claim 3, wherein the at least one group is select from the group of: physical and logical elements.

11. The computer-program product as recited in claim 5, wherein the selection criterion is based on at least one attribute of a selected one of the elements.

12. The computer-program product as recited in claim 5, wherein the at least one group is select from the group of: physical and logical elements.

13. The apparatus as recited in claim 3, wherein the selection criterion is further based on a selection from a group consisting of an MPLS network and an MPLS-VPN network.

14. The computer program product as recited in claim 5, wherein the selection criterion is further based on a selection from a group consisting of an MPLS network and an MPLS-VPN network.

15. The method of claim 1; where a user selects the criterion.

16. The apparatus of claim 3; where a user selects the criterion.

17. The program product of claim 5; where a user selects the criterion.

* * * * *